F. B. SEGUR.
COIL WINDING APPARATUS.
APPLICATION FILED NOV. 1, 1916.
1,244,137.
Patented Oct. 23, 1917.
2 SHEETS—SHEET 1.
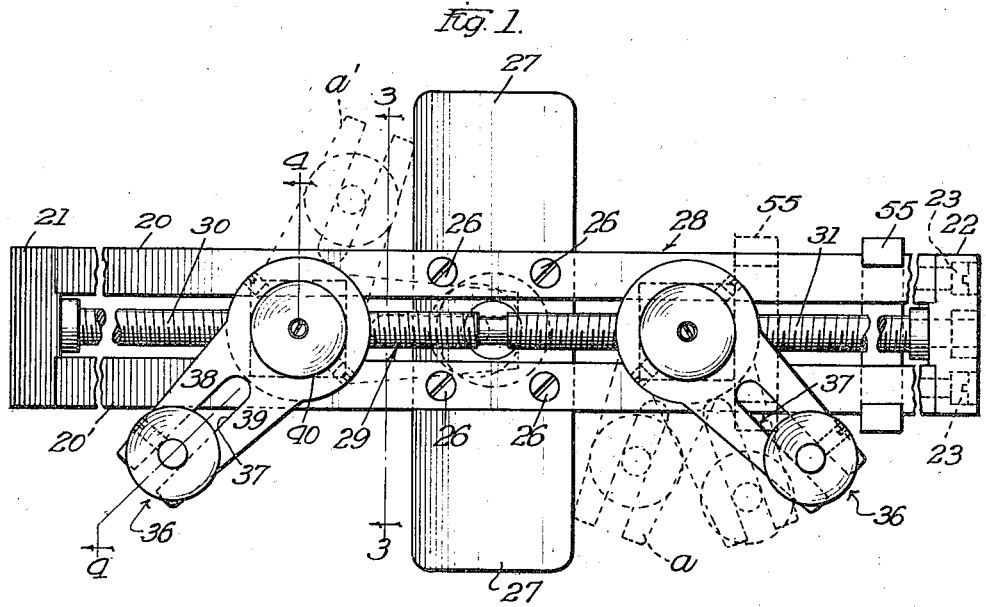
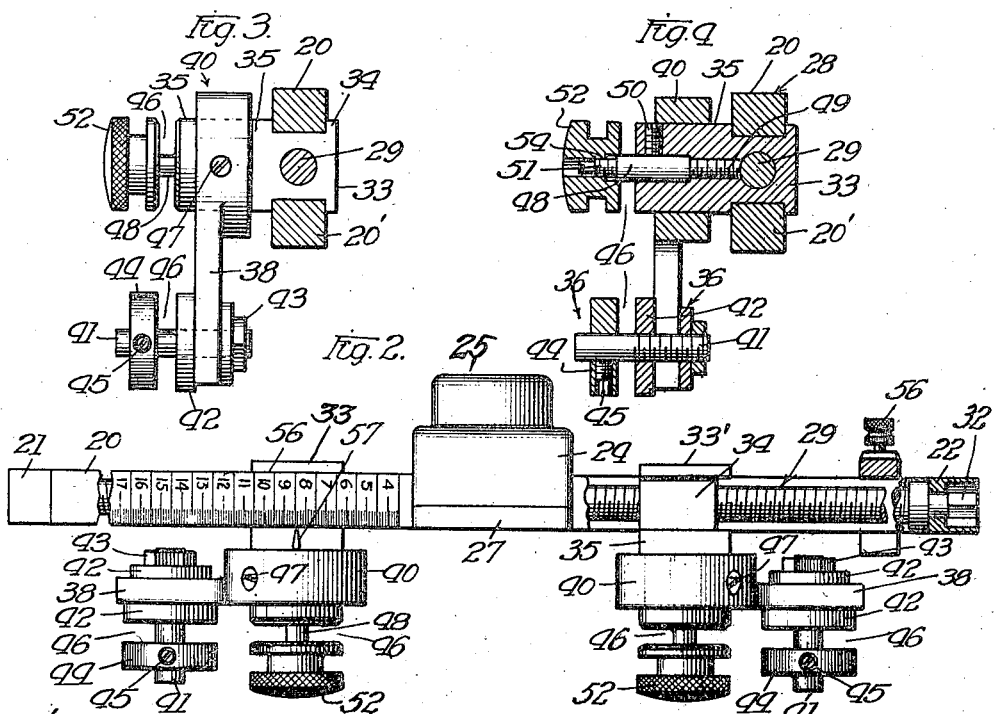
Witnesses:
Robert F. Weir
Arthur W. Carlson
Inventor
Frank B. Segur
Foree Bain & May
Attys.

F. B. SEGUR.
COIL WINDING APPARATUS.
APPLICATION FILED NOV. 1, 1916.
1,244,137.
Patented Oct. 23, 1917.
2 SHEETS—SHEET 2.
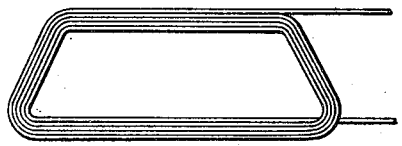
Fig. 7.
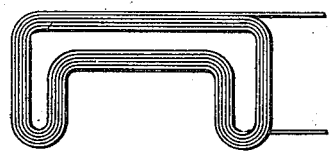
Fig. 8.
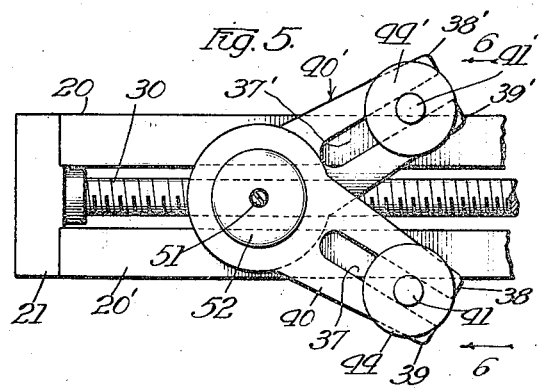
Fig. 5.
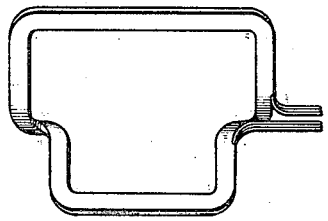
Fig. 9.
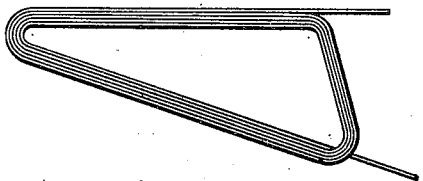
Fig. 11.
Fig. 10.
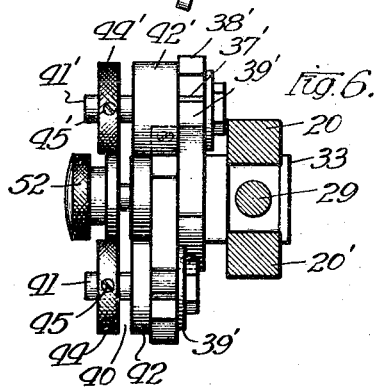
Fig. 6.
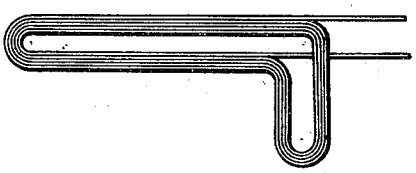
Fig. 12.
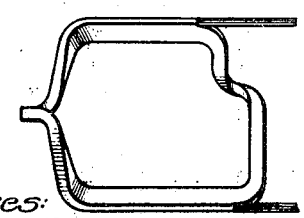
Fig. 13.
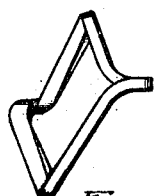
Fig. 14.
Witnesses:
Robert Muir
Arthur W. Carlson
Inventor
Frank B. Segur
Foreé Bain May
Attys

UNITED STATES PATENT OFFICE.

FRANK B. SEGUR, OF CHICAGO, ILLINOIS.

COIL-WINDING APPARATUS.

1,244,137.  Specification of Letters Patent.  Patented Oct. 23, 1917.

Application filed November 1, 1916. Serial No. 128,895.

*To all whom it may concern:*

Be it known that I, FRANK B. SEGUR, a citizen of the United States, residing at Chicago, in the county of Cook and State of Illinois, have invented certain new and useful Improvements in Coil-Winding Apparatus, of which the following is a specification.

My invention relates to improvements in coil winding apparatus and has especial reference to devices of this character for winding coils for armatures and stators of dynamo electric machines.

One of the objects of my invention is to provide an apparatus for winding coils of various shapes and sizes, whereby to more easily and truly reshape them, by coil forming machines, into the shape and size desired for the finished products.

Another object of my invention is to provide a coil winding apparatus adjustable to vary the length, width, thickness and depth of the coil and to change the configuration of the ends of the coil and the parts for effecting said adjustments capable of being fixed whereby any number of variously formed coils of uniform dimensions and shape may be wound.

Other and further objects of my invention will become readily apparent to persons skilled in the art, from a consideration of the following description when taken in conjunction with the drawings, wherein:—

Figure 1 is a side elevation of the coil winding apparatus showing the various positions of the coil receiving parts in dotted lines.

Fig. 2 is a plan view of the apparatus.

Fig. 3 is a transverse section taken on line 3—3 of Fig. 1.

Fig. 4 is a transverse section taken on line 4—4 of Fig. 1.

Fig. 5 is a side elevation of a modification of Fig. 1.

Fig. 6 is a transverse section taken on line 6—6 of Fig. 5.

Fig. 7 is a coil wound by the coil winding apparatus.

Fig. 8 shows the second step in subsequently reshaping the coil.

Fig. 9 shows the coil shaped and extended as the finished product, ready for application to the magnetic core.

Fig. 10 shows an end view of the finished coil.

Fig. 11 shows another form of coil that may be wound upon the apparatus.

Fig. 12 shows the second step of reshaping the coil.

Fig. 13 shows further shaping and tapering of the second coil.

Fig. 14 shows an end view of Fig. 13.

In all the views the same reference characters are employed to indicate similar parts.

In preparing form-wound coils for application to armature cores or stator frames of dynamo electric machines, the coils are first wound upon a rotating frame to facilitate the operation of subsequently forming the coils. The coils are then taped and subsequently placed in a coil-shaping machine whereby they are reshaped so that they will readily fall into positions in the slots prepared for them on the cores of armatures or stators of dynamo electric machines. In winding coils of this character it is essential that certain allowances be made to compensate for the "take up" incident to reshaping so that when the coils are finished they will be of the proper dimensions to fit snugly and neatly on the cores around which they are to be placed.

In my coil winding apparatus the parts that determine the length of the coil are adjustable toward and from each other and justable toward and from each other and along the path of such adjustable parts I have placed a scale graduated to indicate the length of the coil either directly or indirectly and an index on the movable member and on these coil-forming supports I provide rotatable coil-holding parts, or wings, which determine the width of the coil and the shape of the coil ends by rotating them about the axis of the first mentioned coil-forming parts. On each of these coil-supporting members there are adjustable parts for determining the width of the coil. I have also provided an adjustable stop on the frame to which said coil supports may be returned after being moved toward each other to facilitate removal of the coil from the winding apparatus.

In the specific embodiment shown, two parallel bars 20 and 20' are held together by end pieces 21 and 22, as by means of countersunk screws 23; 23. The frame thus made is secured to a lug 24 which terminates in a centrally disposed, rearwardly extending hub 25. The hub is intended as a means for securing the device to a chuck or other holding part of a suitable rotatable tool. The lug 24 is substantially square and is provided with depressions within which the side members or bars 20 and 20' of the frame, are contained and in which they are secured by the screws 26. A plate 27 is secured to or is an integral part of the lug 24 and extends on either side of the lug and at right angles to the frame composed of the side members 20 and 20'. To this plate and to the ends of the frame 28 a safety guard like a flat ring may be secured.

Extending axially of the frame 28, composed of the members 20—20', is a rotatable screw 29 provided with a right hand screw threaded end 30 and a left hand screw threaded end 31. The screw 29 finds bearings in the end members 21 and 22 and is squared at its end, as at 32, for a suitable wrench by which it is to be rotated. On each end of the frame 28 is a wire-receiving coil-forming device, comprising a stud 33 having screw-threaded engagement with the screw 29 and squared, as at 34, and cut away between the squared and round portions so as to provide depressions to receive the frame members 20 and 20' of the frame 28. These studs are freely slidable between the frame members and movable by the screw 29 when the latter is rotated as by means of a wrench or key suitably to engage the squared head 32. When the screw is turned in a given direction the studs 33—33' will approach each other and when turned in the opposite direction they will be caused to move away from each other, decreasing the distance between them when rotated in one direction and increasing the distance between them when rotated in the opposite direction. Each of the studs 33 is provided with a rounded portion 35 upon which to support a wing member 40. The wing member 40 is slotted, as at 37, to provide two arms, 38 and 39, between which to radially adjust a wire receiving member 36. The latter member consists of a threaded stud 41 provided with threaded nuts 42 and 43, whereby to secure the member 36 at adjusted position on the arms 38 and 39. A washer or collar 44 is adjustable along the stem 41 and held in position by means of a screw 45 to leave a wire-receiving coil-forming space 46 between said collar and the washer 42. The wing member 40 is rotatable upon the round portion 35 of the stud 33 and may be secured in adjusted position by the screw 47. Projecting axially from the stud 33 is a screw-threaded stem 48, threaded at its inner end 49 for adjustable connection with said stud. A screw 50 will hold the stem 48 in adjusted position. The outer end, 51, of the stem 48, is threaded for a nut 52 which is preferably equal in diameter to the rounded portion 35 of the stud 33. The nut 52 is adapted to be screwed up to a fixed point controlled by the shoulder 54 on the stem and adapted to be removed for taking the coil off of the winding apparatus.

Fig. 1 shows that the wing member 40 may be rotated upon the stud 33 to various positions, shown in dotted lines, in order to shape the ends of the coils to be wound upon the device. When the wing member has been rotated to a new position, it is secured in place by the screw 47 which engages the stud 33. The wire space 46, between the spacing washers, may be increased or decreased by moving the washer 44 on the stem 41 and securing it in place by the screw 45 and by moving the stem 48 outwardly and securing it in adjusted position by the screw 50 so that a coil of any desired width may be wound upon the device.

The coil shown in Fig. 7 is wound upon the device when the parts are in the positions shown in full lines in Fig. 1. To wind the coils, shown in Fig. 11, it is only necessary to remove the member 40 and stem 41, on the left hand side of the device, leaving the wing 40 on the right hand side, in the position shown. To wind a square ended coil, the wing 40 on the right side is moved into dotted line position indicated at $a$ and the wing on the left to position $a'$. The studs 33 may then be separated to the desired distance by rotation of the screw 29. Other and many are the various forms of coils that may be wound upon the device, by changing positions of the wings 40 and the distance between said wings, by rotation of the screw 29.

To further extend the capacity of the device, or to increase its availability for a larger number of coils of varying shapes, I may use two wings 40—40' on the same studs, as shown in the modification of Fig. 5. Fig. 5 shows the wings in position in which a diamond pointed coil may be wound. The wings may be adjusted rotatively around the stud 33 so as to occupy any desired positions and the wings on the two wire-receiving devices may be adjusted differently to form coils of any peculiar or desired shape.

A stop, or slide 55, is adjustable along the frame 28 and is secured in adjusted position by screw 56. The object of this stop is to afford a point where the wire holding devices may be brought back after they have been moved closer together for the purpose of removing the coils.

While I have herein shown a single embodiment of my invention, for the purpose of clear disclosure, it is manifest that many detail changes may be made within the scope and intendment of the accompanying claims without departure from the spirit of my invention.

Having described my invention, what I claim is:—

1. A coil winding form comprising a frame; adjustable studs longitudinally movable on said frame; an arm or wing, for holding a coil support, pivoted to each said stud and a coil support longitudinally adjustable on each said arm and radially with reference to the respective stud.

2. A coil winding form comprising a frame; adjustable studs longitudinally movable on said frame; a plurality of arms or wings, each for holding a coil support, and independently pivoted on the respective studs and a coil support on each said arm adjustable longitudinally thereon and radially with reference to the respective stud.

In testimony whereof I hereunto set my hand in the presence of two subscribing witnesses.

FRANK B. SEGUR.

In the presence of—
   STANLEY W. COOK,
   FORÉE BAIN.